United States Patent
Pickren

(10) Patent No.: US 11,301,367 B2
(45) Date of Patent: Apr. 12, 2022

(54) AUTOMATED FIX VERIFICATION AND REGRESSION TESTING METHOD DERIVED FROM PROOF-OF-CONCEPTS

(71) Applicant: BugPoC, LLC, Clearwater, FL (US)

(72) Inventor: Ryan Pickren, Oldsmar, FL (US)

(73) Assignee: BugPoC, LLC, Clearwater, FL (US)

(*) Notice: Subject to any disclaimer, the term of this patent is extended or adjusted under 35 U.S.C. 154(b) by 0 days.

(21) Appl. No.: 16/893,985

(22) Filed: Jun. 5, 2020

(65) Prior Publication Data

US 2021/0382811 A1    Dec. 9, 2021

Related U.S. Application Data

(60) Provisional application No. 62/983,908, filed on Mar. 2, 2020.

(51) Int. Cl.
*G06F 11/36* (2006.01)
*G06F 21/57* (2013.01)
*G06N 20/00* (2019.01)

(52) U.S. Cl.
CPC ........ *G06F 11/3688* (2013.01); *G06F 21/577* (2013.01); *G06N 20/00* (2019.01); *G06F 2221/033* (2013.01)

(58) Field of Classification Search
CPC .............. G06F 11/3688; G06F 21/577; G06F 2221/033; G06N 20/00
See application file for complete search history.

(56) References Cited

U.S. PATENT DOCUMENTS

| | | | | |
|---|---|---|---|---|
| 8,185,877 B1* | 5/2012 | Colcord | ............. | G06F 11/3692 717/127 |
| 8,423,620 B2* | 4/2013 | Keum | ................. | G06F 11/3684 709/206 |
| 8,972,487 B2* | 3/2015 | Todorova | ................ | H04L 43/50 709/203 |
| 10,467,132 B1* | 11/2019 | Chatterjee | .......... | G06Q 10/0639 |
| 10,592,398 B1* | 3/2020 | Dwarakanath | ...... | G06F 11/3672 |
| 10,977,161 B2* | 4/2021 | Godefroid | ........... | G06F 11/3688 |
| 2006/0277606 A1* | 12/2006 | Yunus | ................... | G06F 21/577 726/25 |
| 2008/0059558 A1* | 3/2008 | Singh | .................... | G06F 16/958 709/202 |
| 2008/0109680 A1* | 5/2008 | Kodaka | ............... | G06F 11/3688 714/38.1 |
| 2009/0282136 A1* | 11/2009 | Subramanian | .......... | G06F 11/36 709/222 |

(Continued)

Primary Examiner — Douglas M Slachta
(74) Attorney, Agent, or Firm — GrayRobinson, P.A.

(57) ABSTRACT

A system used with a software as a service platform to aid in the building, sharing, and automatic retesting of working demonstrations of computer code to fix cybersecurity vulnerabilities. The PoC is built on a Software as a Service platform in a standard format after which supporting applications can be run the PoC to dynamically rebuild an environmental setup which includes, but is not limited to, an HTTP client capable of parsing and repeating raw requests, a server capable of hosting and rendering arbitrary HTML code at a specified domain name, and a Python interpreter with precompiled dependencies. This invention allows for a fully-managed regression testing service by leveraging existing PoC data with dynamic parameters, containerized environments, and conditional logic.

14 Claims, 2 Drawing Sheets

(56) References Cited

U.S. PATENT DOCUMENTS

| | | | |
|---|---|---|---|
| 2015/0058680 A1* | 2/2015 | Kortti | G06F 11/3684 |
| | | | 714/47.2 |
| 2015/0106791 A1* | 4/2015 | Karuppiah | G06F 11/3688 |
| | | | 717/127 |
| 2015/0339213 A1* | 11/2015 | Lee | G06F 3/0484 |
| | | | 717/125 |
| 2016/0147645 A1* | 5/2016 | Kandpal | G06F 11/3688 |
| | | | 717/124 |
| 2018/0217921 A1* | 8/2018 | Palyekar | G06F 11/3688 |
| 2019/0065345 A1* | 2/2019 | Patel | G06F 11/3612 |
| 2019/0095320 A1* | 3/2019 | Biswas | G06F 21/552 |
| 2021/0067607 A1* | 3/2021 | Gardner | H04L 67/34 |

\* cited by examiner

AUTOMATED FIX VERIFICATION AND REGRESSION TESTING METHOD DERIVED FROM PROOF-OF-CONCEPTS

CROSS-REFERENCE TO RELATED INVENTIONS

This applications claims the benefit of earlier-filed provisional application No., 62/983,908, titled "Automated Fix Verification and Regression Testing Method Derived from Proof-of-Concepts," filed Mar. 2, 2020, the disclosure of which is hereby incorporated by reference herein.

TECHNICAL FIELD

This disclosure relates to a system for the automatic retesting of cybersecurity vulnerabilities. Specifically, this disclosure relates to a system used with a software as a service platform to aid in the building, sharing, and retesting of working demonstrations of computer code to fix cybersecurity vulnerabilities in software.

BACKGROUND OF THE INVENTION

The software vulnerability reporting lifecycle at most technology companies usually entails the following steps: (1) the vulnerability is discovered and reported to the responsible party; (2) the responsible party uses the reporter's steps to reproduce the issue; (3) the responsible party then attempts to fix the issue by pushing a code or configuration change to a development or production environment; (4) the responsible party verifies that the reporter's reproduction steps no longer induce the undesired behavior; and optionally (5) the responsible party adds a regression check in the form of unit, integration, or canary test.

The model used by most technology companies requires the responsible party, who is usually the vendor of vulnerable software, to manually retest the issue after every fix attempt and then, optionally, write additional software to automate this testing on a regular cadence. These optional regression tests tend to be in the form of a unit test (i.e. a simple logic condition of an isolated class or function), integration test (i.e. workflow to verify proper interaction between multiple software components), or canary test (i.e. end-to-end evaluation of the entire software stack and environment).

The present inventions comprises a novel system to automatically generate software that retests a particular cybersecurity vulnerability using artifacts of that vulnerability's proof-of-concept ("PoC") which can then be used to replace steps 4 and 5 of the above-described workflow. A "proof-on-concept" or "PoC" is defined herein as static files, environmental setups, supporting applications, or other computer-based infrastructure that illustrate security issues. The system may also incorporate machine learning of certain types. The machine learning that can be incorporated includes "Active Learning," which is defined as the use of algorithms to interactively query a user (or some other information source) to label new data points with the desired outputs, and "Continuous Learning," which is defined as the use of algorithms to smoothly update prediction models to take into account different tasks and data distributions while still being able to re-use and retain previously-stored data.

Therefore, it is an object of this invention to provide an improvement which overcomes the aforementioned inadequacies of the prior art and provides an improvement which is a significant contribution to the advancement of the cybersecurity vulnerability reporting and retesting art.

A further object of the present invention is to use supporting applications to dynamically rebuild the environmental setup required to run the PoC.

A further object of the present invention is to include an HTTP client capable of parsing and repeating raw requests, a server capable of hosting and rendering arbitrary HTML code at a specified domain name, and a Python interpreter with precompiled dependencies.

A further object of the present invention is to deploy these environments in isolated containers so that all aspects of the PoC are destroyed and rebuilt for each run invocation.

A further object of the present invention is to create a platform that is quick and not tedious.

A further object of the present invention is to allow for a well-formatted PoC to be turned into a regression testing canary with minimal setup or overhead.

A further object of the present invention is to create a platform that does not require continuous maintenance by a security team.

A further object of the present invention is to allow for reproducibility of testing.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new system used with a software as a service platform to aid in the building, sharing, and automatic retesting of working demonstrations of computer code to fix cybersecurity vulnerabilities.

Embodiments of the present invention are herein described by way of example and are directed to a system for automatic retesting of PoCs. The aforementioned state of the art of cybersecurity vulnerability reporting and retesting shows the need for improvements, specifically in the ability of an automatic retesting method to be secure on the client-side. The PoC is built on a Software as a Service platform in a standard format after which supporting applications can be run the PoC to dynamically rebuild an environmental setup which includes, but is not limited to, an HTTP client capable of parsing and repeating raw requests, a server capable of hosting and rendering arbitrary HTML code at a specified domain name, and a Python interpreter with precompiled dependencies.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure and its advantages, reference is now made to the following descriptions, taken in conjunction with the accompanying drawings, in which.

Similar reference numerals refer to similar parts throughout the several views of the drawings.

DETAILED DESCRIPTION OF THE DRAWINGS

The present invention relates to a platform to automatically retest cybersecurity proof-of-concepts (PoCs). The various components of the present invention, and the manner in which they interrelate, are described in greater detail hereinafter.

Figure 1:
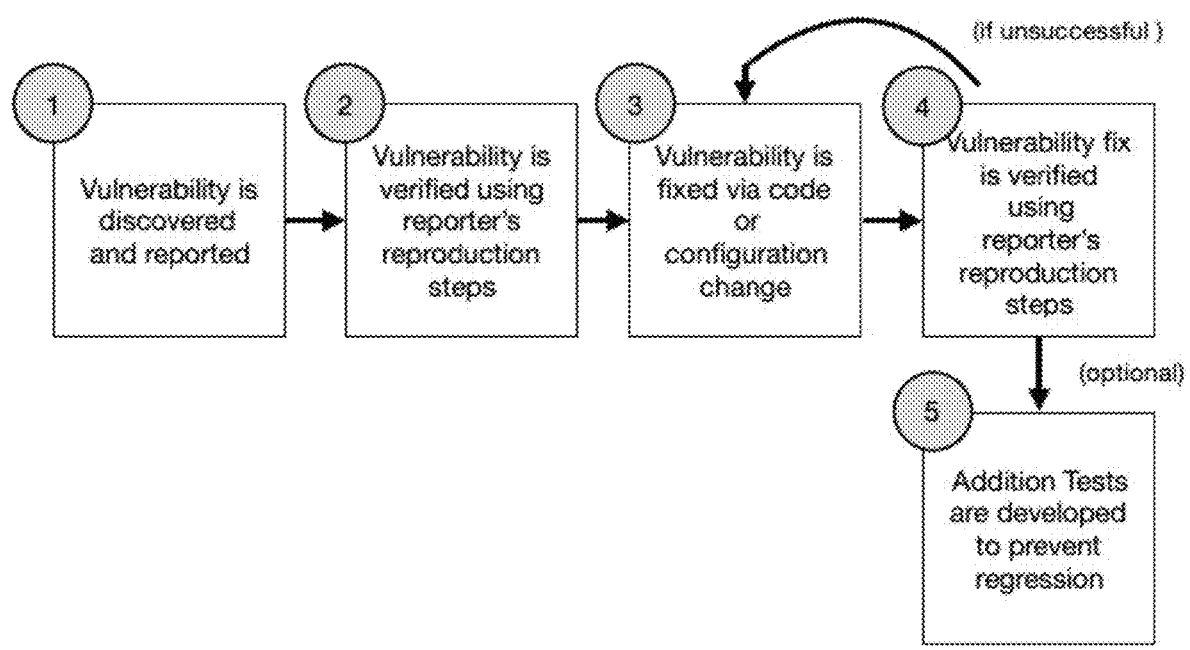
FIG. 1 is a flowchart depicting a method of software vulnerability reporting and retesting present in the prior art.

As can be seen in FIG. 1, prior art platforms worked in one of two ways. In the first model, as shown in FIG. 1, (1) the vulnerability is discovered and reported to the responsible party; (2) the responsible party uses the reporter's steps to reproduce the issue; (3) the responsible party then attempts to fix the issue by pushing a code or configuration change to a development or production environment; (4) the responsible party verifies that the reporter's reproduction steps no longer induce the undesired behavior; and optionally (5) the responsible party adds a regression check in the form of unit, integration, or canary test.

The issue with this model is that the responsible party, normally the vendor of the vulnerable software, has to manually retest the issue after every fix attempt (step 4 above) and then, optionally, write additional software to automate this testing on a regular cadence.

Figure 2:
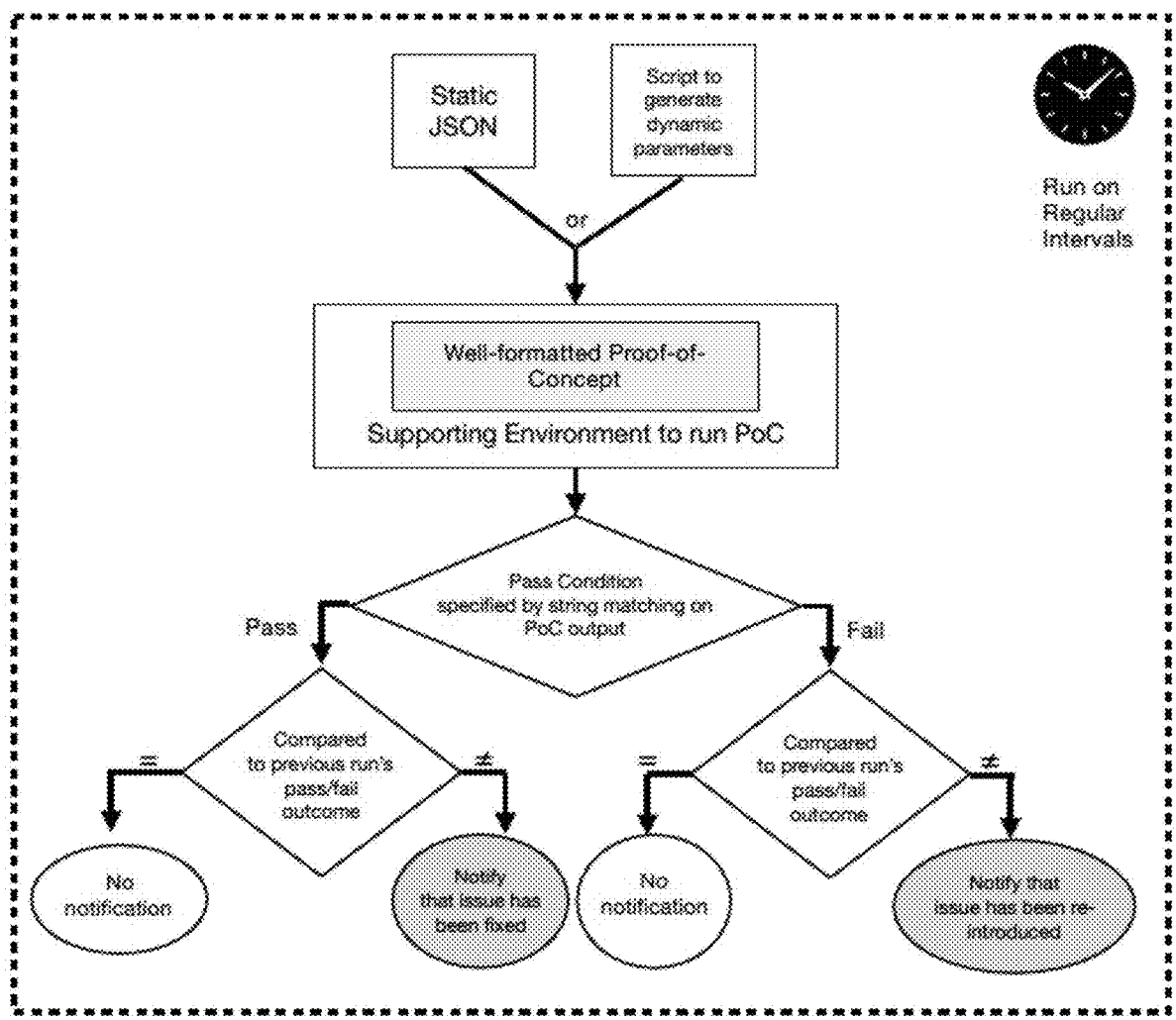
FIG. 2 is a flowchart the system of vulnerability reporting and retesting of the present invention.

The present invention, as shown in FIG. 2, comprises a new model to automatically retest particular cybersecurity vulnerabilities using artifacts of that vulnerability's PoC. This system allows responsible parties to replace steps 4 and 5 of the prior art. The present system relies on a software-as-a-service (SaaS) platform on which the PoC was built and, because the PoC is built on a central platform with a standard format, the present invention can use supporting applications to dynamically rebuild the environmental setup required to run the PoC. These environments include, but are not limited to, an HTTP client capable of parsing and repeating raw requests, a server capable of hosting and rendering arbitrary HTML code at a specified domain name, and a Python interpreter with precompiled dependencies. These environments are deployed in isolated containers so that all aspects of the PoC are destroyed and rebuilt for each run invocation.

As can be seen in FIG. 2, the responsible party or any other use can turn a well-formatted PoC into a regression testing canary with minimal setup or overhead. The user can specify parameters for the PoC in either a static JSON (JavaScript Object Notation) document or dynamically via custom scripts. These custom parameter-generating scripts will be run before each invocation of the PoC to ensure the PoC is always given valid arguments. Next, the user will specify a Pass Condition against which each PoC will be run. This condition will be used to evaluate if the PoC produced the desired results thereby allowing the user to infer the current state of vulnerability. The condition can be in the form of a string matching system such as Regex on PoC output. Finally, the user can specify the cadence for which they would like the test to run after which the user can be alerted via push notifications if the software determines that a given PoC has changed its response state (i.e. "fail-to-pass" or "pass-to-fail"). A "fail-to-pass" alert indicates that the issue has been fixed (presumably due to a code or configuration change) while a "pass-to-fail" alert indicates that a regression has occurred (like due to a code refactor that re-introduced the issue). This invention allows for a fully-managed regression testing service by leveraging existing PoC data with dynamic parameters, containerized environments, and conditional logic.

Alternative embodiments of the present invention allow for the use of machine learning for better improvement of the computing system. In one embodiment, leverage of the user's specification of certain conditions such as pass conditions and fail conditions allows for the automatic building of a supervised or unsupervised dataset, which may or may not be a cross-customer dataset, of PoCs, PoC-responses, and PoC-metadata. This dataset may include labels that correspond to the conditions for which the user should be notified of a potential regression. The data in the dataset may include, but is not limited to, the entire proxied HTTP(s) traffic of the PoC environment (regardless of environment type—Front End, HTTP, or Python), the start time of the PoC invocation, the duration of the PoC run, and the IP addresses of both the client and servers involved. This dataset can be used in a binary-classification or multi-classification machine learning model to automatically classify if PoC belongs to a certain class (such as Pass Conditions, Fail conditions, etc.) This embodiment can be used to automatically notify users that one of their PoCs has produced a potentially worrisome response, even though it technically passed their specified condition.

The invention may also include in the dataset the progression of the PoC as it was developed by a security expert and may additionally include all other data from historic runs of a particular PoC. The invention may also include methods of feature extraction, including but not limited to parsing raw requests and responses, as defined in RFC 2616 and related documentation, before storing the data in the dataset. Additionally, a confidence score may be incorporated for the system to inform the user whether it believes a PoC belongs to certain pass conditions, fail conditions, or other conditions. This confidence score can be user to prioritize which PoCs should be manually inspected first by a user. The system may also include a feedback mechanism, which may allow a flagged PoC that has been manually viewed by the user to help further train or improve the system through Active Learning, Continuous Learning, or another similar method. The system may also incorporate regression models to predict the likelihood of a given outcome, including but not limited to the likelihood that a PoC has regressed which can then be used to notify the user of the regression.

Furthermore, the invention may use Machine Learning to attempt to train a Regression-Test Cadence Prediction Model that predicts the optimal cadence for which to run a given PoC. The cadence may be summarized as a frequency to run (such as every two hours, every 10 seconds, etc.) or may be an irregular cadence (such as every weekday, a random cadence, etc.) or may be a cadence that is dependent upon external signals (such as when the number of active users exceeds a threshold, when the load on a system reaches a certain level, when the network bandwidth is below a given threshold, etc.) The system may record the responses of a PoC for a set period to measure deviations in PoC response-characteristics and metadata. This response-characteristics and metadata includes, but is not limited to, the entire proxied HTTP(s) traffic of the PoC environment (regardless of environment type—Front End, HTTP, or Python), the start time of the PoC invocation, the duration of the PoC run, and the IP addresses of both the client and servers involved. The proxied HTTP(s) traffic can further be parsed to isolate notable features of the raw requests and responses, as defined in RFC 2616 and related documentation. Once a PoC has been monitored for a set period of time, the system may grant the PoC a "deviation score," which represents how frequently the underlying technology is shifting (either due to application code change, load balancing at the network layer, or other dynamic properties in the technology stack). This score may then used, in conjunction with the PoC's success/failure rate (determined using the methods described in this specification), to train a Regression-Test Cadence Prediction Model that can automatically predict the PoC's optimal regression-testing-cadence based on the learned likelihood of the PoC to regress and reintroduce the bug. This likelihood score will directly influence the cadence at which the PoC should be re-run and scrutinized. (i.e. PoC's that are unlikely to regress can be tested less frequently than PoCs with a high likelihood of regression). This system can be used to automatically suggest alterations to a user's cadence preferences (either to increase cadence for extra security or reduce cadence for cost savings), or to suggest that a PoC that currently has no regression testing (cadence of zero) be added to the system.

The system may optionally combine supervised or unsupervised techniques to determine the likeness between PoCs for predicting the Regression-Test Cadence for PoCs that are determined to be similar. An example could be where two XSS PoCs exists on the same, or similar web applications, so the system predicts that they should have similar Regression-Test Cadences. Further, the system may combine supervised or unsupervised techniques to determine the likeness between PoCs for creating dynamic Regression-Test Cadence for semantically related PoCs. An example could be where PoCs related to a system or network or systems learn a Regression-Test Cadence, where the triggering of one PoC causes the system to evaluate other PoCs in the system. The system may also combine techniques in order to predict a PoC's likelihood to regress. Finally, the system may also create a Regression-Test Cadence for a grouping of PoCs that uses learned similarities of the PoCs and/or predictions of the PoC's likelihood-to-regress to create a Regression-Test Cadence that may incorporate a higher rate of regression testing for certain PoCs that may or may not trigger the regression testing of related PoCs based on the data captured from the regression tests of other PoCs.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of cybersecurity vulnerability retesting comprising:
    specifying parameters for at least one proof-of-concept;
    building the at least one proof-of-concept on a software-as-a-service platform in a separate environmental setup, the environmental setup selected from the group consisting of an HTTP client capable of parsing and repeating raw requests, a server capable of hosting and rendering arbitrary HTML code at a specified domain name, and a Python interpreter with precompiled dependencies;
    specifying at least one pass condition for the at least one proof-of-concept;
    automatically evaluating whether the pass condition has been satisfied; and
    performing at least one regression test wherein a user controls a cadence at which the regression test is performed comparing a previous evaluation by re-running the parameters and wherein if a pass condition turns into a fail condition a user is notified that an issue has been reintroduced to the system and wherein if a fail condition turns into a pass condition a user is notified that a vulnerability issue has been fixed.

2. The method of cybersecurity vulnerability retesting of claim 1 wherein the parameters are specified using a JavaScript object notification document.

3. The method of cybersecurity vulnerability retesting of claim 1 wherein the parameters are specified using a dynamic custom script developed by a user.

4. The method of cybersecurity vulnerability retesting of claim 1 wherein the pass condition wherein the pass condition is in the form of a string matching system.

5. The method of cybersecurity vulnerability retesting of claim 1 wherein the cadence of the regression test is determined using a regression-test cadence prediction model.

6. The method of cybersecurity vulnerability retesting of claim 5 wherein the proof-of-concept is given a deviation score after a set number of regression tests using the regression-test cadence prediction model to directly influence the cadence at which the proof-of-concept should be re-run.

7. The method of cybersecurity vulnerability retesting of claim 1 wherein multiple proof-of-concepts may be evaluated using the regression tests such that similarity between proof-of-concepts can be determined for the creation of dynamic regression-test cadence for at least one other semantically related proof-of-concept.

8. A method of cybersecurity vulnerability retesting comprising:
    specifying parameters for a plurality of proof-of-concepts;
    building each proof-of-concept on a software-as-a-service platform in a separate environmental setup, the environmental setup selected from the group consisting of an HTTP client capable of parsing and repeating raw requests, a server capable of hosting and rendering arbitrary HTML code at a specified domain name, and a Python interpreter with precompiled dependencies;
    specifying at least one pass condition for each proof-of-concept;
    automatically evaluating whether the pass condition has been satisfied;
    performing multiple regression tests having a cadence that compare previous evaluations by re-running the parameters and wherein if a pass condition turns into a condition a user is notified that an issue has been reintroduced to the system and wherein if a fail condition turns into a pass condition a user is notified that a vulnerability issue has been fixed; and
    wherein the cadence is determined using a regression-test cadence prediction model.

9. The method of cybersecurity vulnerability retesting of claim 8 wherein the parameters are specified using a JavaScript object notification document.

10. The method of cybersecurity vulnerability retesting of claim 8 wherein the parameters are specified using a dynamic custom script developed by a user.

11. The method of cybersecurity vulnerability retesting of claim 8 wherein the pass condition wherein the pass condition is in the form of a string matching system.

12. The method of cybersecurity vulnerability retesting of claim 8 wherein a user controls the cadence at which the regression test is performed.

13. The method of cybersecurity vulnerability retesting of claim 8 wherein each proof-of-concept is given a deviation score after a set number of regression tests using the regression-test cadence prediction model to directly influence the cadence at which the proof-of-concept should be re-run.

14. A method of cybersecurity vulnerability retesting comprising:
- specifying parameters for multiple proof-of-concepts;
- building each proof-of-concept on a software-as-a-service platform in a separate environmental setup, the environmental setup selected from the group consisting of an HTTP client capable of parsing and repeating raw requests, a server capable of hosting and rendering arbitrary HTML, code at a specified domain name, and a Python interpreter with precompiled dependencies;
- specifying at least one pass condition for each proof-of-concept;
- automatically evaluating whether the pass condition has been satisfied;
- performing multiple regression tests having a cadence that compare previous evaluations by re-running the parameters and wherein if a pass condition turns into a fail condition a user is notified that an issue has been reintroduced to the system and wherein if a fail condition turns into a pass condition a user is notified that a vulnerability issue has been fixed wherein the cadence is determined using a regression-test cadence prediction model; and
- giving a deviation score to each proof-of-concept after a set number of regression tests using the regression-test cadence prediction model to directly influence the cadence at which the proof-of-concept should be re-run.

* * * * *